US009409612B2

(12) United States Patent
Mathew et al.

(10) Patent No.: US 9,409,612 B2
(45) Date of Patent: Aug. 9, 2016

(54) SEAL ASSEMBLY FOR TRACK JOINT ASSEMBLY OF UNDERCARRIAGE

(71) Applicant: Caterpillar Inc., Peoria, IL (US)

(72) Inventors: Sunil Mathew, Peoria, IL (US); Mark Kiesel, Peoria, IL (US); Pradeep Chapagain, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 319 days.

(21) Appl. No.: 14/253,485

(22) Filed: Apr. 15, 2014

(65) Prior Publication Data

US 2014/0319905 A1  Oct. 30, 2014

Related U.S. Application Data

(60) Provisional application No. 61/815,622, filed on Apr. 24, 2013.

(51) Int. Cl.
| *F16J 15/00* | (2006.01) |
| *B62D 55/088* | (2006.01) |
| *F16J 15/32* | (2016.01) |
| *B62D 55/21* | (2006.01) |
| *F16J 15/34* | (2006.01) |

(52) U.S. Cl.
CPC ............ *B62D 55/0887* (2013.01); *B62D 55/21* (2013.01); *F16J 15/3204* (2013.01); *F16J 15/3456* (2013.01)

(58) Field of Classification Search
CPC ... F16J 15/324; F16J 15/3212; F16J 15/3208; F16J 15/32; F16J 15/3204; F16J 15/3456
See application file for complete search history.

(56) References Cited

U.S. PATENT DOCUMENTS

| 3,595,572 A | 7/1971 | Granda |
| 3,759,586 A | 9/1973 | Otto et al. |
| 4,195,852 A | 4/1980 | Roley et al. |
| 4,204,716 A | 5/1980 | Baylor |

(Continued)

FOREIGN PATENT DOCUMENTS

| CA | 1181108 A1 | 5/1981 |
| DE | 2244408 A1 | 3/1974 |

(Continued)

OTHER PUBLICATIONS

Caterpillar, Inc., "All the Right Choices"; Corporate Publication PEDJ0100; 2011; USA.

(Continued)

*Primary Examiner* — Gilbert Lee
(74) *Attorney, Agent, or Firm* — Leydig, Voit & Mayer, Ltd.

(57) ABSTRACT

A seal assembly can be incorporated into a track joint assembly of an undercarriage of a track-type machine. The track joint can have a first member pivotable about a rotational axis relative to a second member thereof. The first member includes a seal member engagement surface defining, at least in part, an axially-extending seal cavity about the rotational axis and within which the seal assembly is disposed. The seal assembly can include a thrust ring and a seal member mounted to the thrust ring. The seal member includes a first member engagement surface, a second member engagement surface, a frusto-conical inner relief surface, a thrust ring engagement surface, and an outer relief surface.

20 Claims, 7 Drawing Sheets

(56) References Cited

U.S. PATENT DOCUMENTS

| | | | |
|---|---|---|---|
| 4,262,914 A * | 4/1981 | Roley | F16J 15/344 277/381 |
| 4,819,999 A * | 4/1989 | Livesay | F16J 15/344 277/381 |
| 5,269,537 A | 12/1993 | Kiesel | |
| 5,288,086 A | 2/1994 | Kiesel | |
| 5,509,513 A | 4/1996 | Kiesel | |
| 5,941,162 A | 8/1999 | Kiesel | |
| 6,047,970 A | 4/2000 | Friend et al. | |
| 6,065,438 A | 5/2000 | Kiesel | |
| 6,113,108 A | 9/2000 | Friend et al. | |
| 6,116,613 A | 9/2000 | Friend et al. | |
| 6,129,358 A | 10/2000 | Kiesel et al. | |
| 6,457,304 B1 | 10/2002 | Bedford et al. | |
| 7,766,433 B2 | 8/2010 | Mulligan et al. | |
| 8,113,597 B2 | 2/2012 | Grenzi | |
| 8,678,696 B2 | 3/2014 | Johannsen et al. | |
| 2002/0117075 A1 * | 8/2002 | Maguire | B62D 55/088 104/2 |
| 2004/0119245 A1 | 6/2004 | Thomas et al. | |
| 2008/0284245 A1 | 11/2008 | Livesay et al. | |
| 2009/0102281 A1 | 4/2009 | Diekevers et al. | |
| 2009/0243384 A1 | 10/2009 | Diekevers et al. | |
| 2010/0007205 A1 | 1/2010 | VanderVeen | |
| 2010/0096195 A1 | 4/2010 | VanderVeen | |
| 2010/0096196 A1 | 4/2010 | VanderVeen | |
| 2010/0139993 A1 | 6/2010 | Sebright et al. | |
| 2010/0148575 A1 | 6/2010 | Johannsen et al. | |
| 2010/0156169 A1 | 6/2010 | Angot et al. | |
| 2010/0209180 A1 | 8/2010 | Hasselbusch et al. | |
| 2011/0006597 A1 | 1/2011 | Diekevers et al. | |
| 2011/0135383 A1 | 6/2011 | Recker et al. | |
| 2011/0243648 A1 | 10/2011 | Johannsen et al. | |
| 2011/0254364 A1 | 10/2011 | Johannsen et al. | |
| 2012/0002910 A1 | 1/2012 | Snyder et al. | |
| 2012/0153713 A1 | 6/2012 | Yelistratov | |
| 2012/0153714 A1 | 6/2012 | Yelistratov | |
| 2012/0155953 A1 | 6/2012 | Khare et al. | |
| 2012/0163950 A1 | 6/2012 | Seljestad | |
| 2012/0193976 A1 | 8/2012 | Diekevers et al. | |
| 2012/0193977 A1 | 8/2012 | Clarke et al. | |
| 2012/0193978 A1 | 8/2012 | Diekevers et al. | |
| 2012/0193980 A1 | 8/2012 | Diekevers et al. | |
| 2012/0267859 A1 | 10/2012 | Liang et al. | |
| 2012/0301257 A1 | 11/2012 | Seljestad | |
| 2012/0328400 A1 | 12/2012 | Seljestad | |
| 2013/0002010 A1 | 1/2013 | Hasselbusch et al. | |
| 2013/0002011 A1 | 1/2013 | Meyer et al. | |
| 2013/0043719 A1 | 2/2013 | Wietharn et al. | |

FOREIGN PATENT DOCUMENTS

| | | |
|---|---|---|
| GB | 2313881 | 12/1997 |
| JP | H02-093170 A | 4/1990 |

OTHER PUBLICATIONS

Caterpillar, Inc., "Cat Positive Pin Retention 2 (PPR2) Track"; Corporate Publication PEHJ0276; 2011; USA.

* cited by examiner

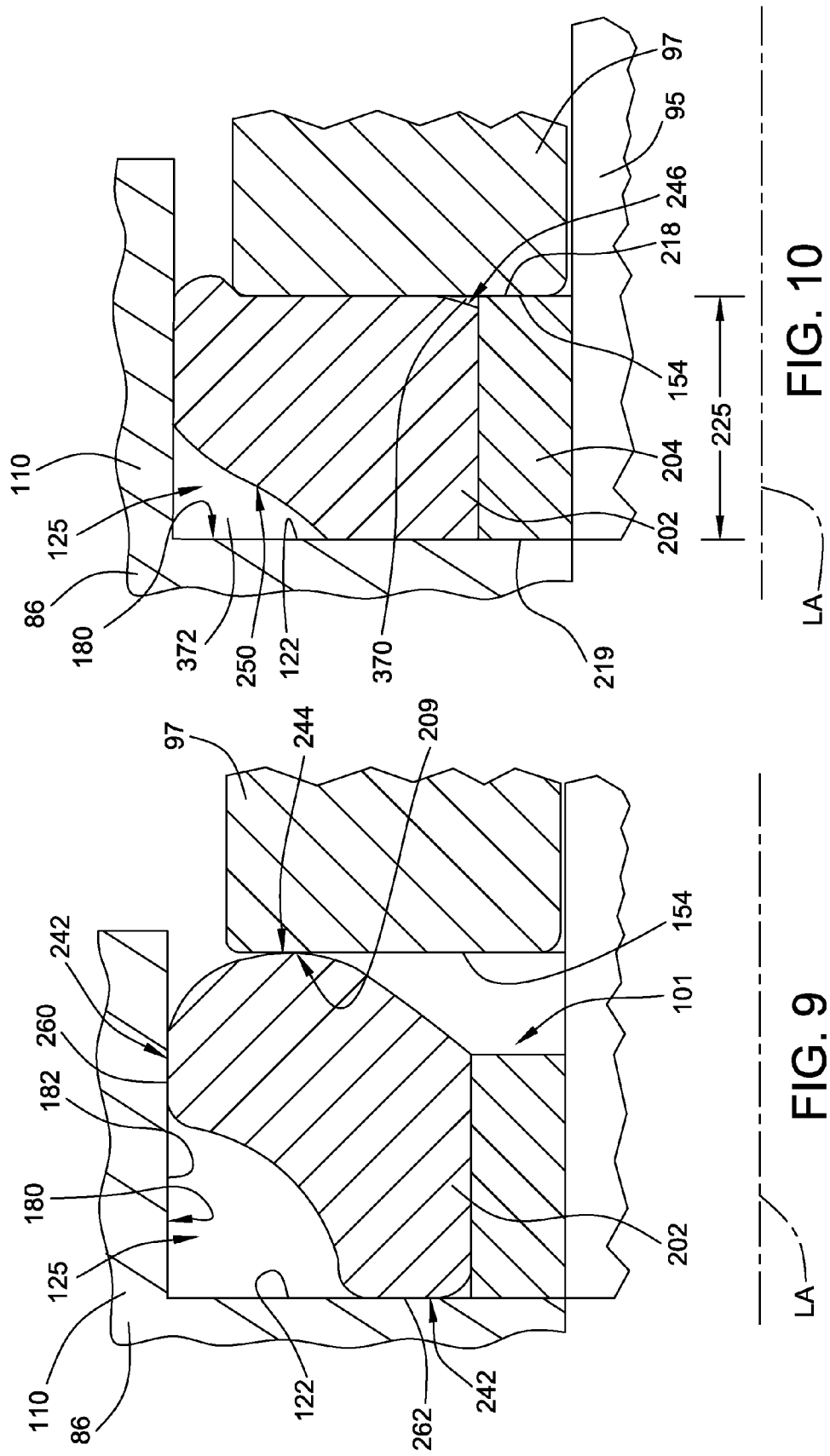

SEAL ASSEMBLY FOR TRACK JOINT ASSEMBLY OF UNDERCARRIAGE

CROSS-REFERENCE TO RELATED APPLICATION

This patent application claims the benefit of priority to U.S. Patent Application No. 61/815,622, filed Apr. 24, 2013, and entitled "Seal Assembly for Track Joint Assembly of Undercarriage," which application is incorporated in its entirety herein by this reference.

TECHNICAL FIELD

This patent disclosure relates generally to an undercarriage for a track-type machine and, more particularly, to a seal assembly for use in a track pin joint assembly of the undercarriage.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as the environments identified above. Specifically, rather than rolling across a work surface on wheels, track-type machines utilize one or more track assemblies that include an endless loop of coupled track links defining exterior surfaces, which support ground-engaging track shoes, and interior surfaces that travel about one or more rotatable track-engaging elements, such as, drive sprockets, idlers, tensioners, and rollers, for example.

Typical track chain assembly designs include a track pin either rotatably or fixed to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements. Consequently, seal assemblies are placed in the track joints to exclude contaminants and retain lubricant within the track joint to facilitate the aforementioned relative movement of the bushings and the track links during use.

These designs have included a variety of seal configurations and positions such as against an inside face of the link or against the track bushing. For example, U.S. Pat. No. 4,204,716 for a "Track Joint With a Thrust Ring and a Seal Ring," issued May 27, 1980, to John M. Baylor is directed to a track joint with a thrust ring and a seal ring wherein there is a track pin and a cylindrical bushing on the pin and two track links. The end of the bushing and one of the track links present annular surfaces faced toward each other but spaced apart. A thrust ring extends between the annular surfaces and a seal ring is on the thrust ring and extends in two legs radially outwardly from the thrust ring and into contact with the respective annular surfaces for sealing therewith.

An ongoing problem occurs over time when excessive endplay and "pin walking" result in track sections becoming loose or disconnected. Such downtime events can lead to significant losses in productivity for the affected machine.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal member adapted for use in sealing a joint having a first member pivotable about a rotational axis relative to a second member thereof. The seal member includes a first member engagement surface, a second member engagement surface, a frusto-conical inner relief surface, a thrust ring engagement surface, and an outer relief surface.

The first member engagement surface includes an axial segment, extending along the rotational axis, and a radial segment, extending along a radial axis perpendicular to the rotational axis. The second member engagement surface is adjacent the axial segment of the first member engagement surface. The frusto-conical inner relief surface is adjacent the second member engagement surface such that the second member engagement surface is between the axial segment of the first member engagement surface and the frusto-conical inner relief surface. The thrust ring engagement surface extends along the rotational axis between the radial segment of the first member engagement surface and the frusto-conical inner relief surface. The outer relief surface is disposed between the radial segment and the axial segment of the first member engagement surface. The second member engagement surface extends radially outward, measured along the radial axis, of the radial segment of the first member engagement surface.

In another embodiment, a seal assembly is adapted for use in sealing a joint having a first member pivotable about a rotational axis relative to a second member thereof. The seal assembly includes a thrust ring and a seal member mounted to the thrust ring. The thrust ring includes an outer axial surface extending along the rotational axis. The seal member includes a first member engagement surface, a second member engagement surface, a frusto-conical inner relief surface, a thrust ring engagement surface, and an outer relief surface.

The first member engagement surface includes an axial segment, extending along the rotational axis, and a radial segment, extending along a radial axis perpendicular to the rotational axis. The second member engagement surface is adjacent the axial segment of the first member engagement surface. The frusto-conical inner relief surface is adjacent the second member engagement surface such that the second member engagement surface is between the axial segment of the first member engagement surface and the frusto-conical inner relief surface. The thrust ring engagement surface extends along the rotational axis between the radial segment of the first member engagement surface and the frusto-conical inner relief surface. The thrust ring engagement surface is in contacting relationship with the outer axial surface of the thrust ring. The outer relief surface is disposed between the radial segment and the axial segment of the first member engagement surface. The second member engagement surface extends radially outward, measured along the radial axis, of the radial segment of the first member engagement surface.

In another embodiment, a track subassembly is adapted for use in an undercarriage of a machine. A track pin defining a longitudinal axis. A first member and a second member are both coaxial with the track pin about the longitudinal axis. The first member is pivotable about the longitudinal axis with respect to the second member. The first member includes a seal member engagement surface defining, at least in part, a seal cavity disposed in proximal relationship to the second member. One of the first member and the second member is rotatively coupled to the track pin by a swaged connection.

A seal assembly is disposed in the seal cavity and sealingly engages the first member and the second member. The seal assembly includes a thrust ring and a seal member mounted to the thrust ring.

The thrust ring is coaxial with the track pin about the longitudinal axis. The thrust ring includes an outer axial surface, an inner axial surface, and first and second end faces. The outer axial surface and the inner axial surface extend along the longitudinal axis between the first and second end faces. The inner axial surface is in proximate relationship with the track pin, and The seal member includes a first member engagement surface, a second member engagement surface, a frusto-conical inner relief surface, a thrust ring engagement surface, and an outer relief surface. The first member engagement surface is in sealing relationship with the seal member engagement surface of the first member. The first member engagement surface includes an axial segment, extending along the longitudinal axis, and a radial segment, extending along a radial axis perpendicular to the longitudinal axis. The second member engagement surface is in sealing relationship with the second member. The second member engagement surface is adjacent the axial segment of the first member engagement surface. The frusto-conical inner relief surface is adjacent the second member engagement surface such that the second member engagement surface is between the axial segment of the first member engagement surface and the frusto-conical inner relief surface. The thrust ring engagement surface extends along the longitudinal axis between the radial segment of the first member engagement surface and the frusto-conical inner relief surface. The thrust ring engagement surface is in contacting relationship with the outer axial surface of the thrust ring. The outer relief surface is disposed between the radial segment and the axial segment of the first member engagement surface. The second member engagement surface extends radially outward, measured along the radial axis, of the radial segment of the first member engagement surface.

Further and alternative aspects and features of the disclosed principles will be appreciated from the following detailed description and the accompanying drawings. As will be appreciated, the principles related to track seal assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 9 is a view as in FIG. 8, illustrating the track seal assembly installed about a track pin and in abutting relationship to a track link and a bushing and in an uncompressed position.

FIG. 10 is a view as in FIG. 9, illustrating the track seal assembly in a compressed position.

DETAILED DESCRIPTION

The present disclosure provides a seal assembly for a track chain joint assembly of an undercarriage of a track-type machine. Examples of such machines include machines used for construction, mining, forestry, and other similar industries. In some embodiments, the machine can be an excavator, dozer, loader, or any other on-highway or off-highway vehicle having a track-type undercarriage with first and second track assemblies on opposing sides thereof. Track chain assemblies of the undercarriage can be adapted to engage the ground, or other surface, to propel the track-type machine.

In embodiments, a seal assembly constructed according to principles of the present disclosure can include a seal member and a thrust ring. Embodiments of a seal assembly constructed in accordance with principles of the present disclosure can be adapted to withstand a predetermined axial thrust load without over-straining the seal member during assembly or operation. A seal member constructed according to principles of the present disclosure can be made using simplified tooling with increased mold-run production yields compared to seal members with more complex cross-sectional shapes (e.g., a W-shaped cross-sectional shape).

Figure 1:
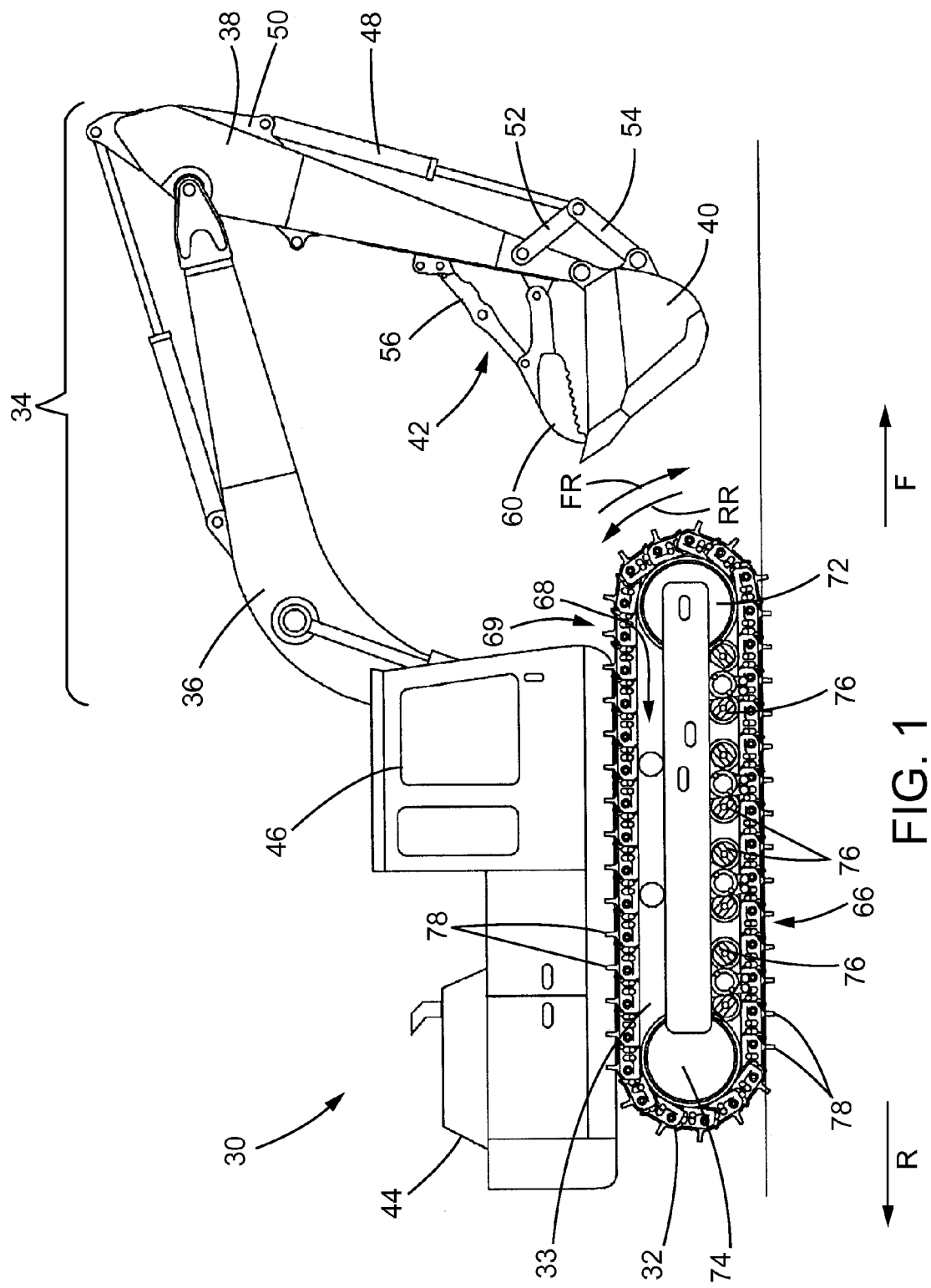
FIG. 1 is a diagrammatic side elevational view of an embodiment of a track-type machine.

Turning now to the Figures, there is shown in FIG. 1 an exemplary embodiment of a machine 30 with a track-type undercarriage 32 for propelling the machine 30 mounted to a frame 33 of the machine 30. The machine 30 may also be referenced herein as a track-type machine. In embodiments, the machine 30 can comprise a fixed or mobile machine that performs some type of operation associated with an industry such as mining, construction, farming, transportation, or any other industry known in the art. In different embodiments, the machine 30 may be an earth-moving machine, such as an excavator, a backhoe, or a dozer, a loader, or any other on-highway or off-highway vehicle.

The illustrated machine 30 comprises an excavator which includes an implement system 34 having a boom 36, a stick or lifting arm 38 pivotally attached to the boom 36, a bucket 40 pivotally attached to the stick 38, and a thumb assembly 42 pivotally attached to the stick 38. The machine 30 can also include a power source 44 adapted to provide power to the implement system 34 and the track-type undercarriage 32 and an operator station 46 adapted to provide an enclosure for an operator and to house an operator control system adapted to control the power source 44, the implement system 34 and the track-type undercarriage 32.

The stick or lifting arm 38 is typically hydraulically operated to move the bucket 40 to a location where the bucket 40 can be curled, or pivoted relative to the stick 38, to scoop up material, and then to move the bucket 40 to a further location where the bucket 40 can be uncurled, or pivoted in an opposing direction, to empty material from the bucket 40. The pivotal movement of the bucket 40 can be controlled by a hydraulic actuator 48 connected to a proximal end 50 of the stick 38 and a series of linkage members 52, 54 which are pivotally connected to the stick 38 and bucket 40 as is known in the art.

The thumb assembly 42 is pivotally coupled to the stick 38 and disposable in a range of operating positions. The thumb assembly 42 can include a link member 56 and a thumb member 60, which are both pivotally attached to the stick 38 and to each other. The thumb assembly 42 can be adapted to cooperate with the bucket 40 to grasp objects between the thumb member 60 and the bucket 40.

In embodiments, the power source 44 can comprise an engine, such as, for example, a diesel engine, a gasoline engine, a gaseous fuel-powered engine, or any other type of combustion engine known in the art. In other embodiments, the power source 44 can comprise a non-combustion source of power such as a fuel cell, a power storage device, or another source known in the art. In embodiments, the power source 44 can be adapted to produce a mechanical or electrical power output that may then be converted to hydraulic pneumatic power for moving the implement system 34.

The undercarriage 32 includes a first track chain assembly 66 disposed on a first side 68 of the frame 33 and a second track chain assembly (not shown) disposed on a second side 69 of the frame 33. The second side 69 is in opposing relationship to the first side 68. Together, the track assemblies are adapted to engage the ground, or other surface, to propel the machine 30.

It should be appreciated that the track assemblies of the machine 30 may be similar and, further, may represent mirror images of one another. As such, only the first track chain assembly 66 will be described herein, and it should be understood that the description of the first track chain assembly 66 is applicable to the second track chain assembly, as well.

The first track chain assembly 66 extends about a plurality of rolling elements such as a drive sprocket 72, an idler 74, and a plurality of track rollers 76. The first track chain assembly 66 includes a plurality of ground-engaging track shoes 78 for engaging the ground, or other surface, and propelling the machine 30.

During typical operation of the undercarriage 32, the drive sprockets 72 of the first and second track chain assemblies are selectively driven such that the track chain assemblies move in a forward rotational direction "FR" to propel the machine 30 in a forward direction "F," and such that the track chain assemblies move in a reverse rotational direction "RR" to propel the machine 30 in a reverse direction "R." The drive sprockets 72 of the undercarriage 32 can be independently operated to allow the machine 30 to turn.

While the machine 30 is illustrated in the context of a track-type machine, it should be appreciated that the present disclosure is not thereby limited, and that a wide variety of other machines having tracks are also contemplated within the present context. For example, in other embodiments, the track chain assembly 66 can be included in a conveyor system, as a track for transmitting torque between rotating elements, or in any other application known to those skilled in the art.

Figure 2:
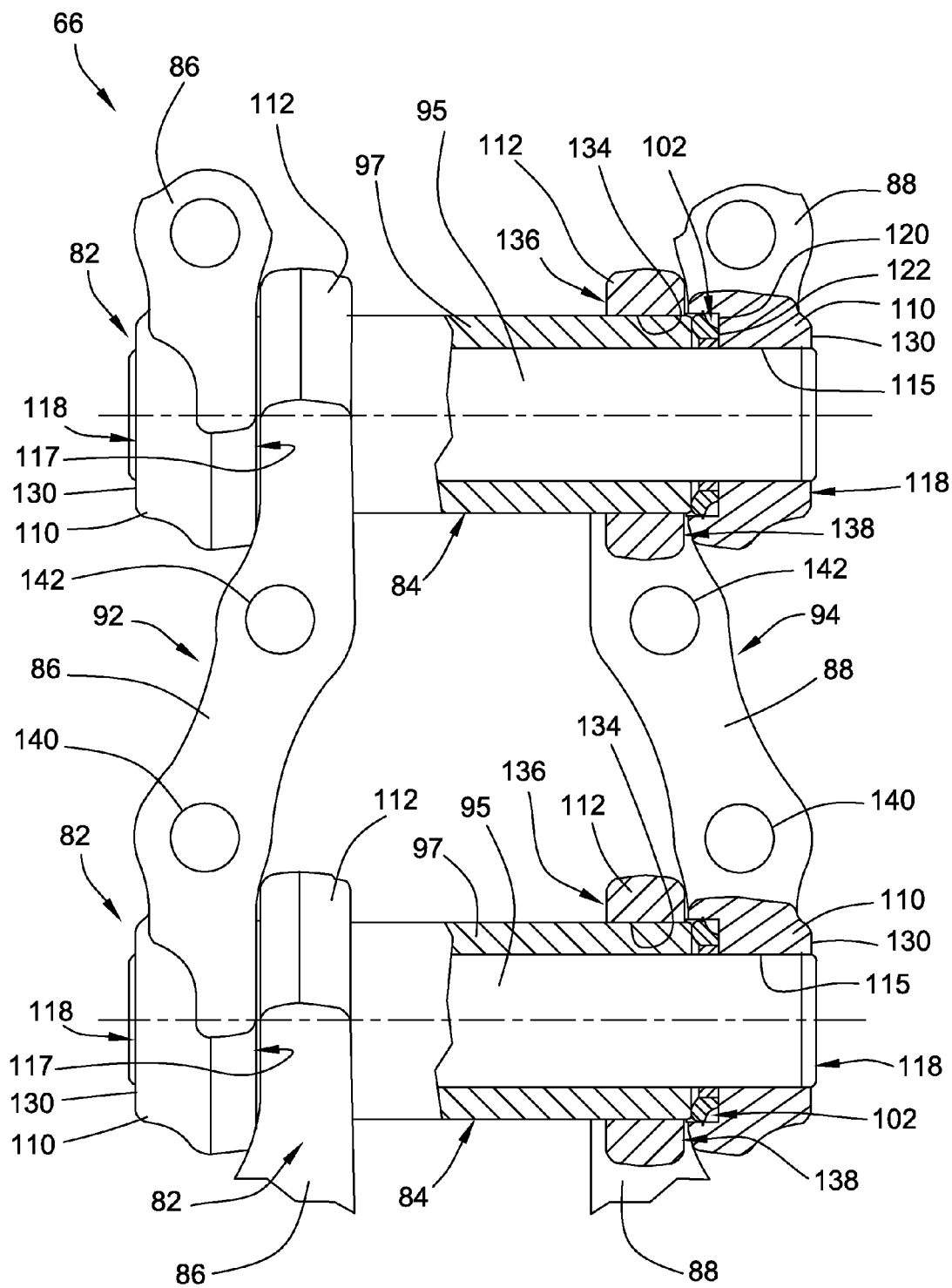
FIG. 2 is a top plan view of a portion of an embodiment of a track chain assembly constructed in accordance with principles of the present disclosure, illustrating inner and outer links mounted to a track pin in an uninstalled condition so as to show an embodiment of a seal assembly constructed in accordance with principles of the present disclosure in an uncompressed position for illustrative purposes.

Referring now to FIG. 2, the first track chain assembly 66, only a portion of which is shown, includes a plurality of track subassemblies 82. Each track subassembly 82 includes a track joint assembly 84, an inner link 86, an outer link 88 in lateral, spaced relationship to the inner link 86, and a track shoe 78 (not shown in FIG. 2) connected to the inner and outer links 86, 88. The first track chain assembly 66 is constructed from a plurality of the track subassemblies 82 which are articulately coupled in a transverse relation of the first track chain assembly 66 by the respective track joint assemblies 84. A number of track subassemblies 82 are mechanically coupled to adjacent fore and aft track subassemblies 82 so that, when an appropriate number of the track subassemblies 82 are connected together, the track chain assembly 66 is formed. The first track chain assembly 66 has a predetermined length for a given application with opposite ends that are adapted to be connected together to form a closed loop such that an inner chain 92 of a series of inner links 86 and an outer chain 94 of a series of outer links 88 are coupled together via a plurality of track joint assemblies 84.

It should be recognized that the terms "inner" and "outer," in reference to the links 86, 88 of each subassembly 82 in this example are used merely as descriptors for the orientation shown in the Figures and the location of the links relative to a centerline of the machine 30. Other terms, such as "left" and "right" and "first" and "second," could be interchangeably used as well. It should be understood that these terms are merely convenient labels applied to the different views and are not meant to be limiting in any way.

The track joint assembly 84 is illustrated according to one of several possible embodiments of the present disclosure. The illustrated track joint assembly 84 includes a track pin 95, a bushing 97 rotatable relative to the track pin 95, a first seal assembly 101 (see FIG. 3, also), and a second seal assembly 102. The first and second seal assemblies 101, 102 are adapted to help keep lubricant inside the track joint assembly 84 and to help prevent dirt and other debris from entering the joint. The illustrated track joint assembly 84 is a grease-lubricated track joint.

Referring to FIG. 2, the inner and outer links 86, 88 in this embodiment are shown as being offset links each having an outboard end collar 110 and an inboard end collar 112 in opposing relationship to the outboard end collar 110. The inner and outer links 86, 88 are mirror images of each other. It should be appreciated that the offset relationship of the outboard end collar 110 and the inboard end collar 112 of each of the respective links 86, 88 permits the outboard end collar 110 of one link to overlap the inboard end collar 112 of an adjoining link in the respective inner and outer chains 92, 94.

It should be understood that the description of the inner link 86 is applicable to the outer link 88. In other embodiments, the inner and outer links 86, 88 can be any other suitable style.

Figure 3:
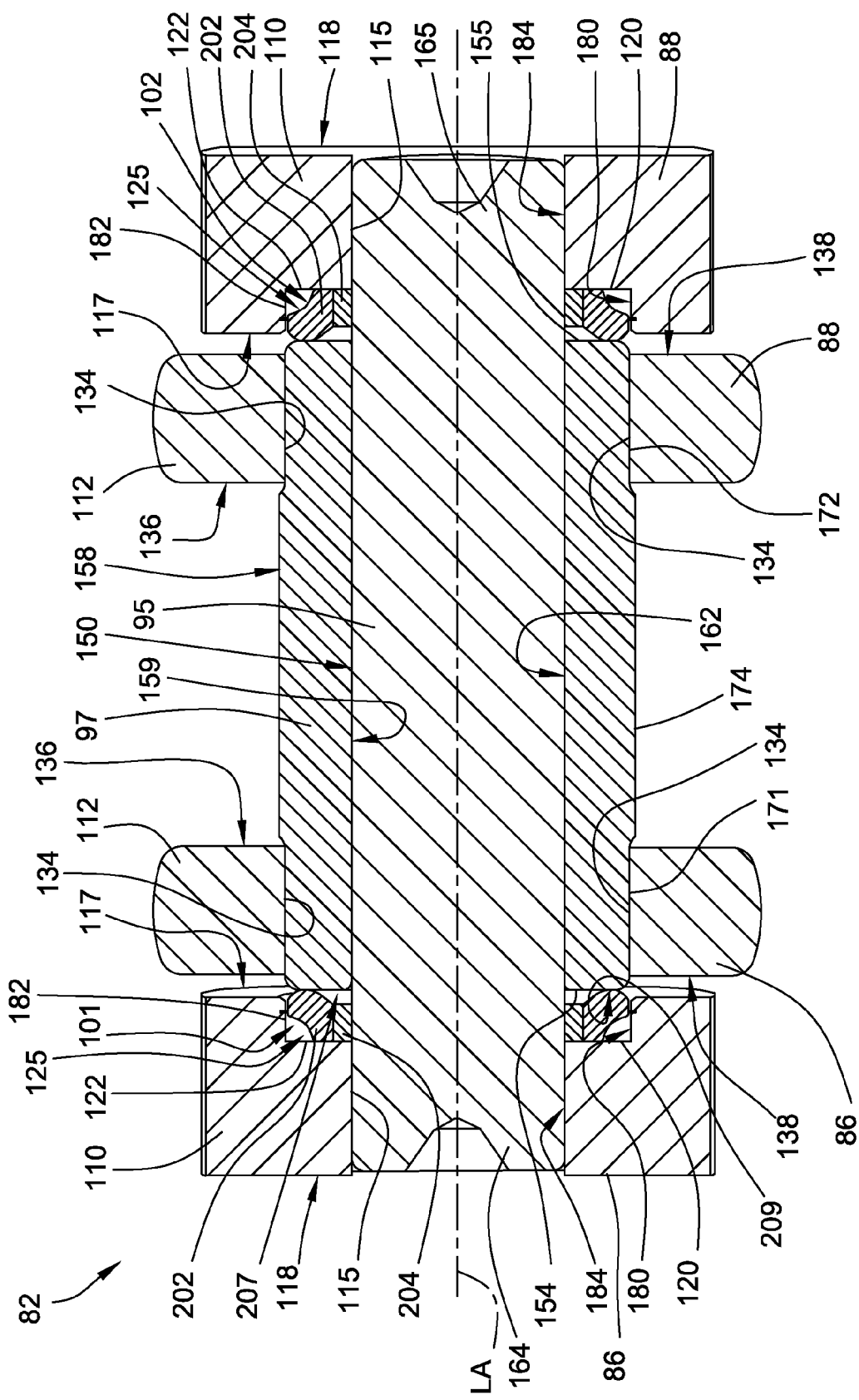
FIG. 3 is a longitudinal cross-sectional view of a track subassembly constructed in accordance with principles of the present disclosure and suitable for use in the track chain assembly of FIG. 2, illustrating inner and outer links in an uninstalled condition so as to show seal assemblies constructed in accordance with principles of the present disclosure in an uncompressed position for illustrative purposes.

Referring to FIGS. 2 and 3, the outboard end collar 110 defines a pin bore 115 extending therethrough from an interior side surface 117 to an exterior side surface 118 of the outboard end collar 110. The track pin 95 is retentively disposed in the pin bores 115 of the outboard end collars 110 of the inner and outer links 86, 88 of each track subassembly 82. It should be understood that in FIGS. 2 and 3, the outboard end collars 110 of the inner and outer links 86, 88 are shown in an uninstalled condition so as to illustrate the first and second seal assemblies 101, 102 in an uncompressed position. When the outboard end collars 110 of the inner and outer links 86, 88 are placed in an installed condition, a seal member 202 of each of the first and second seal assemblies 101, 102 is placed in a compressed position similar to what is shown in FIG. 10, but with a tolerance gap between a thrust ring 204 of each of the first and second seal assemblies 101, 102 and the bushing 97 to facilitate relative rotation therebetween. In embodiments, the track pin 95 is retentively engaged with the outboard end collars 110 of the inner link 86 and the outer link 88 by a respective swaged connection.

Each outboard end collar 110 defines an interior counterbore 120 adjacent the interior side surface 117 and surrounding the pin bore 115. Each interior counterbore 120 has a radial base segment 122 at the bottom thereof that is disposed laterally outwardly from the interior side surface 117. The interior counterbore 120 defined by the outboard end collar 110 of the inner link 86 and the outer link 88 can comprise an axially-extending seal cavity 125 in the form of an annular channel or groove into which the axially opposite ends of the bushing 97 can extend and in which the first and second seal assemblies 101, 102 are respectively installed (see FIG. 3).

As shown in FIG. 2, the exterior side surface 118 of the outboard end collar 110 provides a pin boss 130 which can be adapted to facilitate the swaged connection between the outboard end collar 110 and the track pin 95. In embodiments, the track pin 95 can be provided with one or more circumferential grooves disposed about the end portions of the track pin 95 to further facilitate the swaging process.

In embodiments, material from the pin boss 130 of the outboard end collar 110 can form an interlocked, swaged connection with the track pin 95. The track chain assembly 66 can be assembled in a conventional manner with a track press, and a suitable swage tool can be placed on each of the exterior side surfaces 118 provided on the pin bosses 130 of the outboard end collars 110 and in axial alignment with the track pin 95. A suitable force can then be applied to the swage tool by means of a press, or the like, to extrude a portion of the metal of the pin boss 130 into the grooves about the track pin 95 to form an interlocked, swaged connection. In embodiments, any suitable swaging technique can be used to form a swaged connection between the track pin 95 and one or both of the inner and outer links 86, 88.

The inboard end collar 112 is laterally offset inwardly toward the center of the track chain assembly 66 relative to the outboard end collar 110. The inboard end collar 112 defines a bushing bore 134 extending therethrough from an interior side surface 136 of the inboard end collar 112 to an exterior side surface 138 thereof. The bushing 97 of a forward track subassembly 82 is retentively disposed in the bushing bores 134 of the inboard end collars 112 of the inner and outer links 86, 88 of each track subassembly 82. In embodiments, the bushing 97 is retentively engaged with the inboard end collars 112 of the inner link 86 and the outer link 88 by a respective press-fit connection.

Referring to FIG. 2, a pair of apertures 140, 142 is defined in each of the inner and outer links 86, 88. The track shoe 78 (see FIG. 1) can be releasably fastened to the inner and outer links 86, 88 in a conventional manner by fasteners, such as bolts and nuts (not shown), for example. A fastener can be positioned in each aperture 140, 142 to secure the track shoe 78 to the inner link 86 and the outer link 88. Any number of different varieties of track shoes can be used in other embodiments.

Referring to FIG. 3, the track pin 95 defines a longitudinal axis "LA" and includes an outer surface 150 substantially in the shape of a cylinder concentrically disposed about the longitudinal axis "LA." The pin bores 115 of the outboard end collars 110 of the inner and outer links 86, 88 are concentrically disposed about the longitudinal axis "LA" defined by the track pin 95. The track pin 95 can be rotatively coupled together with the outboard end collars 110 of the inner and outer links 86, 88, such as, by a swaged connection.

The bushing 97 has a pair of opposing first and second end faces 154, 155, a stepped outer surface 158, an inner surface 159 defining a passage in the form of a cylindrical bore 162 therethrough that is concentrically disposed about the longitudinal axis "LA." The bushing 97 is disposed concentrically about the track pin 95 with first and second end portions 164, 165 of the track pin 95 respectively projecting from the first and second end faces 154, 155 of the bushing 97. The first and second end faces 154, 155 of the bushing are annular. In other embodiments, the bushing 97 can have a different shape and configuration as known in the art.

The bushing 97 is rotatably positioned about the track pin 95 such that the bushing 97 can rotate with respect to the track pin 95 about the longitudinal axis "LA." The inner surface 159 of the bushing 97 can be in thrust-transmitting, bearing engagement with the outer surface 150 of the track pin 95. Lubricant—grease, e.g.—can be introduced into the track joint between the track pin 95 and the bushing 97. The bushing 97 is also translatable with respect to the track pin 95 along the longitudinal axis "LA." In use, the sprocket teeth can progressively engage adjacent bushings 97 of succeeding track subassemblies 82 to propel the machine 30.

The illustrated bushing 97 is press fit in the inboard end collars 112 of the adjacent track subassembly 82 such that the bushing 97 is rotatively coupled to the inboard end collars 112 of the aft track subassembly. The bushing 97 can be configured to facilitate the press-fitting operations. The illustrated stepped outer surface 158 defines first and second lands 171, 172 of reduced diameter relative to a central portion 174 thereof such that a pair of stepped shoulders is defined therebetween. The first and second lands 171, 172 are respectively disposed adjacent the first and second end faces 154, 155 and can be sized to fit through the bushing bores 134 of the inboard end collars 112 so as to facilitate a press-fitting operation used to connect the inboard end collars 112 of the aft track subassembly 82 to the bushing 97. The bushing bores 134 of the inboard end collars 112 of the inner and outer links 86, 88 are concentrically disposed about the longitudinal axis "LA" defined by the track pin 95.

The first and second end faces 154, 155 of the bushing 97 are disposed adjacent to the outboard end collars 110 of the inner and outer links 86, 88, respectively. When the inner and outer links 86, 88 are in the installed condition, the first and second end faces 154, 155 of the bushing are in proximate relationship to the thrust ring 204 of the first and second seal assemblies 101, 102, respectively, with a clearance gap therebetween to facilitate the relative rotation of the bushing 97. The first and second end faces 154, 155 of the bushing 97 are in running, sealing engagement with the first and second seal assemblies 101, 102, respectively.

The components of the track subassembly 82 can define a plurality of annular seal grooves or seal cavities 125 that are concentrically disposed about the longitudinal axis "LA" of the track pin 95. Each seal cavity 125 is adapted to house therein a seal assembly constructed according to principles of the present disclosure and suitable for sealingly engaging relatively rotatable components of the track subassembly 82.

In the illustrated embodiment, the outboard end collars 110 of the inner and outer links 86, 88 each defines an axially-extending seal cavity 125 in the form of an annular channel or groove. Each of the outboard end collars 110 of the inner and outer links 86, 88 includes a seal member engagement surface 180 defining, at least in part, the axially-extending seal cavity 125. The seal cavities 125 are positioned in the outboard end collars 110 of the inner and outer links 86, 88 such that the seal cavities 125 are concentric with the central longitudinal axis "LA" of the track pin 95.

Each of the outboard end collars 110 includes an outer cylindrical axial wall segment 182 and the radial base segment 122, which extends between the outer cylindrical axial wall segment 182 and an axially-extending pin bore surface 184 which defines the pin bore 115. The outer cylindrical axial wall segment 182 and the radial base segment 122 define the seal cavity 125. The outer cylindrical axial wall segment 182 is concentrically disposed about the longitudinal axis "LA" of the track pin 95. The illustrated outer cylindrical axial wall segment 182 is generally cylindrical and substantially parallel to the central longitudinal axis "LA."

The seal member engagement surface 180 can include at least part of the outer cylindrical axial wall segment 182 and/or the radial base segment 122. In the illustrated embodiment, the seal member engagement surface 180 includes at least part of both the outer cylindrical axial wall segment 182 and the radial base segment 122. In other embodiments, the seal member engagement surface 180 can have a different shape.

For purposes of illustration, the outboard end collar 110 of the inner link 86 can be considered a "first member," and the bushing 97 can be considered a "second member." The first member in the form of the outboard end collar 110 of the inner link 86 and the second member in the form of the bushing 97 are both coaxial with the track pin 95 about the longitudinal axis "LA." The first member in the form of the outboard end collar 110 of the inner link 86 is pivotable with respect to the second member in the form of the bushing 97 about a rotational axis that coincides with the longitudinal axis "LA" of the track pin 95. The first seal assembly 101, which is constructed in accordance with principles of the present disclosure, can be disposed within the seal cavity 125 defined at least in part by the seal member engagement surface 180. The axially-extending seal cavity 125 is disposed in proximal relationship to the second member in the form of the bushing 97 in this example. In particular, the axially-extending seal cavity 125 is adjacent the first end face 154 of the first member in the form of the bushing 97.

The first seal assembly 101 is adapted for use in sealing a joint having a first member pivotable about a rotational axis relative to a second member, such as the outboard end collar 110 of the inner link 86 being pivotable about the longitudinal axis "LA" of the track pin 95 relative to the bushing 97, for example. The first member in the form of the outboard end collar 110 of the inner link 86 includes the seal member engagement surface 180 which defines, at least in part, the axially-extending seal cavity 125 about the rotational axis "LA" in which the first seal assembly 101 is disposed. The first seal assembly 101 sealingly engages the first member in the form of the outboard end collar 110 of the inner link 86 and the second member in the form of the first end face 154 of the bushing 97 while allowing relative rotation therebetween.

The first seal assembly 101 includes a seal member 202 and a thrust ring 204. The seal member 202 is made from a suitable sealing material such as, an elastomeric material including a polyurethane compound, for example. The thrust ring 204 can be made from any suitable material, such as metal, for example, adapted to carry a predetermined axial load (e.g., 500 kN) without over-straining the seal member 202. In embodiments, the thrust ring 204 is made from a suitable powdered metal.

The thrust ring 204 is concentrically disposed about the track pin 95. The thrust ring 204 is an annular ring and is configured to have an axial length along the longitudinal axis "LA" such that the seal member 202 is allowed to compress to maintain a seal as the bushing 97 moves along the longitudinal axis "LA" relative to the track pin 95, but prevented from undergoing excessive strain during operation and/or assembly (e.g., during swaging of the track pin 95 and the outboard end collar 110 of the inner and outer links 86, 88). The thrust ring can be disposed about track pin 95 such that it is engageable with the bushing 97 to limit the axial movement of the bushing 97 along the longitudinal axis "LA."

The seal member 202 is concentrically disposed about the thrust ring 204 and the track pin 95. The seal member 202 is disposed radially outwardly of the thrust ring 204. The seal member 202 is an annular ring that is adapted to fluidly seal the lubricant within a lubricant area 207 of the joint formed by the bushing 97 and the track pin 95 and to help exclude contaminants from entering the lubricant area 207.

The thrust ring 204 and the seal member 202 are positioned in the seal cavity 125 so that the seal member 202 sealingly engages the seal member engagement surface 180 of the outboard end collar 110 of the inner link 86, which can be considered a first member in this instance, and the first end face 154 of the bushing 97, which can be considered a second member in this instance. The seal member engagement surface 180 of the first member sealingly engages the seal member 202. The seal member 202 can rotate with respect to a sealing surface 209 of the first end face 154 of the bushing 97 against which it is sealingly engaged.

The seal cavity 125 of the outboard end collar 110 of the outer link 88 is substantially similar in configuration to the seal cavity 125 of the outboard end collar 110 of the inner link 86. The second seal assembly 102 is disposed in the seal cavity 125 defined in part by outboard end collar 110 of the outer link 88. The second seal assembly 102 sealingly engages a first member in the form of the outboard end collar 110 of the outer link 88 and a second member in the form of the second end face 155 of the bushing 97 while allowing relative rotation therebetween.

The second seal assembly 102 includes a seal member 202 and a thrust ring 204. The components of the second seal assembly 102 are similar in composition and function to that of the first seal assembly 101 as described above in connection with the seal cavity 125 of the outboard end collar 110 of the inner link 86.

The first and second seal assemblies 101, 102 can each be adapted to sealingly engage both the first and the second members between which it is respectively disposed. The first and second seal assemblies 101, 102 of the track subassembly 82 can be compressively engaged between the respective adjacent components to sealingly contact the sealing surfaces of the adjacent members such that a running fluid-tight seal is formed therebetween. Each seal member 202 can be placed in sealing engagement with its respective first member (e.g., the outboard end collars 110 of the inner and outer links 86, 88, respectively), and is placed in compression against the second member (e.g., the bushing 97). The axial compression of the seal members 202 can provide a sealing force such that each seal member 202 is sealingly engaged against the sealing surface of the second member (e.g., the bushing 97) to form a running fluid-tight seal therebetween. The thrust rings 204 can help limit the axial movement of the first member relative to the second member along the longitudinal axis "LA" and help prevent over-compression of the seal members 202.

The use of the terms "first member" and "second member" are for illustrations purposes and are merely convenient labels applied to illustrative pairs of relatively rotatable components to describe various principles of the present disclosure. These phrases should not be viewed as limiting in any way.

In use, lubricant disposed within the lubricant area 207 of the track subassembly 82 can be applied to the outer surface 150 of the track pin 95. Once disposed on the outer surface 150 of the track pin 95, the lubricant facilitates the rotation of the bushing 97 relative to the track pin 95. Retention of the lubricant within the lubricant area 207 of the track subassembly 82 is assisted by the first and second seal assemblies 101, 102 respectively disposed in the seal cavities 125 of the outboard end collars 110 of the inner and outer links 86, 88 while keeping contaminants out (e.g. sand, dirt, etc).

Referring to FIG. 2, adjacent inner and outer links 86, 88 are rotatively movable with respect to each other about a given track pin 95. In particular, a pair of adjacent inner links 86 and a pair of adjacent outer links 88 can be respectively coupled with the track pin 95 and the bushing 97 of a given track joint assembly 84 to allow the adjacent links to be rotatable with respect to each other about the longitudinal axis "LA" of the track pin 95. In this way, the inner and outer links 86, 88 can rotate relative to adjacent links.

In other embodiments, seal assemblies constructed according to principles of the present disclosure can be used in other track assemblies with different components and seal cavities located in other positions. Accordingly, in other embodiments of a track chain assembly, other components can define suitable seal cavities, and other seal cavity locations within the components of the track joint assembly can be used.

In other embodiments, a pin cartridge assembly can be provided which includes one or more seal assemblies constructed according to principles of the present disclosure. In yet other embodiments of a track chain assembly, the track chain assembly can include a plurality of subassemblies each including at least one seal assembly constructed according to principles of the present disclosure. In yet other embodiments, the track chain assembly can have other track configurations, such as those having multi-piece links.

Referring to FIGS. 4-8, the first seal assembly 101, which is constructed in accordance with principles of the present disclosure, is shown in an uninstalled state wherein the components are not compressed. The first seal assembly 101 includes the seal member 202 and the thrust ring 204 disposed radially inwardly of the seal member 202. Inasmuch as the second seal assembly 102 is substantially identical to the first seal assembly 101, it will be understood that the description of the first seal assembly 101 is also applicable to the second seal assembly 102.

The first seal assembly 101 is adapted to withstand a predetermined load (e.g., 500 kN) along the longitudinal axis "LA" without over-straining the seal member 202 during assembly or operation. Thus, the first seal assembly 101 can be adapted to withstand a high axial swage load (e.g., 500 kN) without adversely affecting the operation of the seal member 202 such that the first seal assembly 101 can be used in a track joint assembly in which the track pin 95 is connected to the inner and outer links 86, 88 by a swaging operation to help inhibit pin walking and excessive end play. A seal member constructed according to principles of the present disclosure can be made using simplified tooling (e.g., a two-piece mold without side pulls) with increased mold-run production (e.g., greater than four seal members at one time per mold shot) yields compared to seal members with more complex cross-sectional shapes (e.g., a W-shaped cross-sectional shape).

Figure 4:
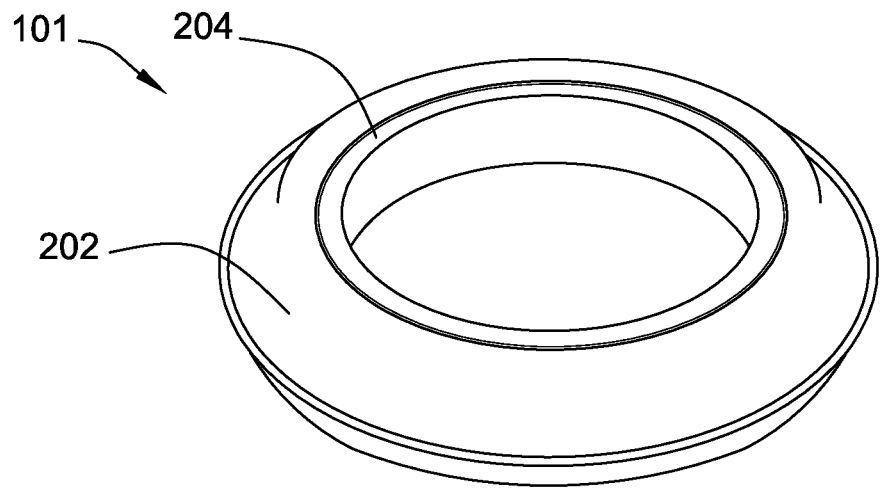
FIG. 4 is a perspective view of a track seal assembly constructed in accordance with principles of the present disclosure.
Figure 5:
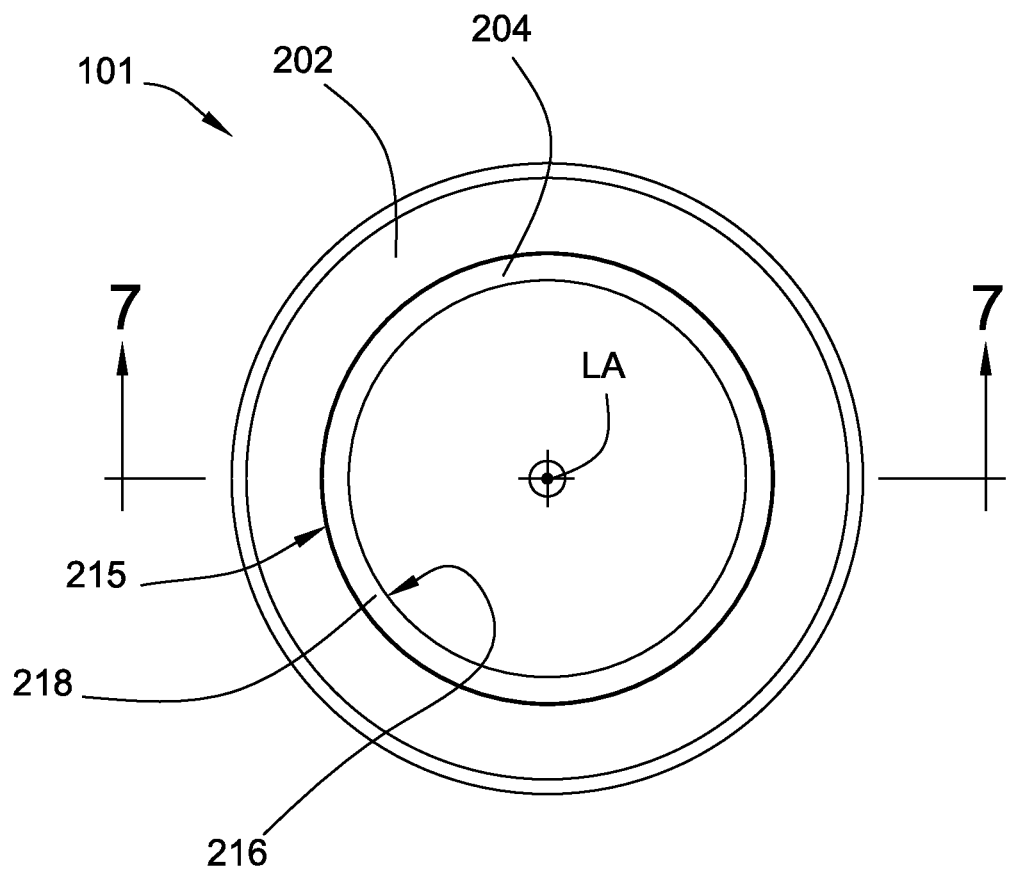
FIG. 5 is an elevational view of the track seal assembly of FIG. 4.
Figure 6:
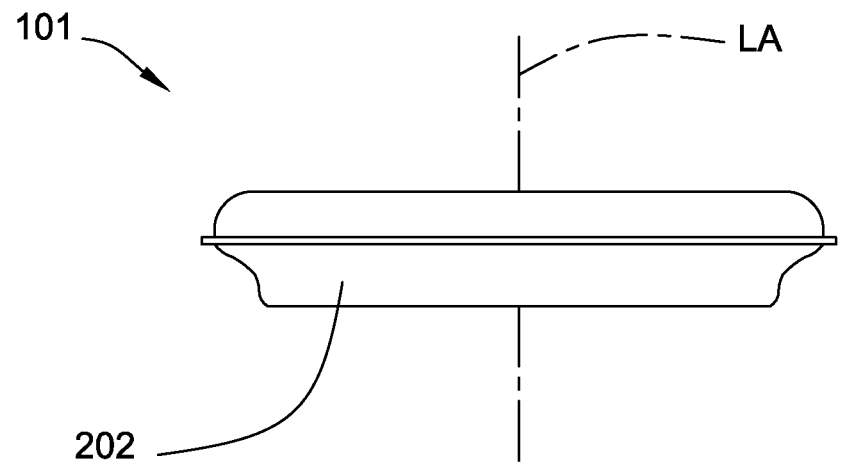
FIG. 6 is an end view of the track seal assembly of FIG. 4.
Figure 7:
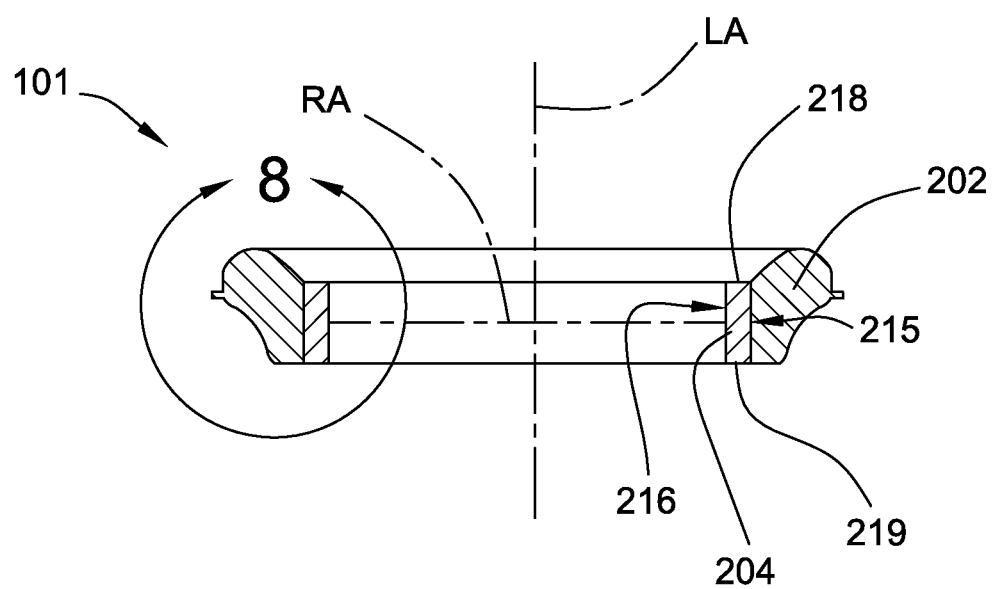
FIG. 7 is a cross-sectional view taken along line 7-7 in FIG. 6 of the track seal assembly of FIG. 4.
Figure 8:
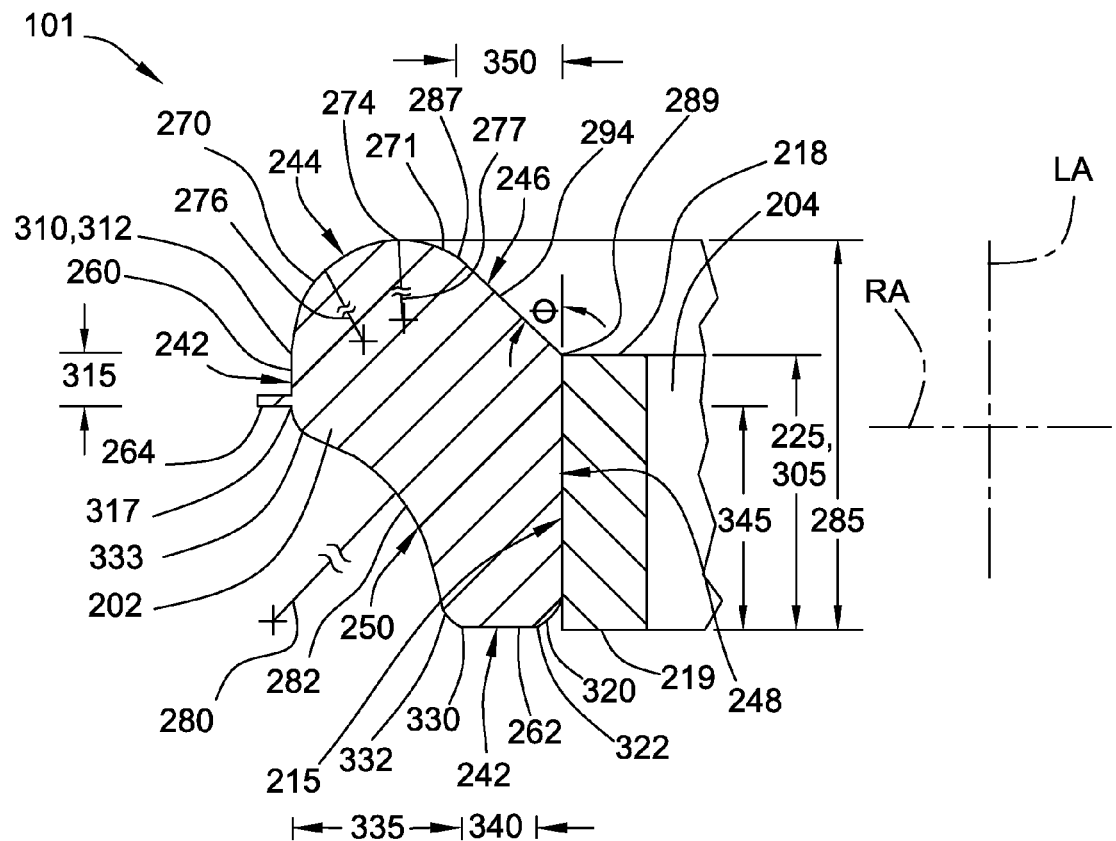
FIG. 8 is an enlarged, detail view taken from FIG. 7.

Referring to FIGS. 4 and 5, the components of the first seal assembly 101 are in the shape of an annular ring. Referring to FIGS. 7 and 8, the cross-sectional shapes of the components of the first seal assembly 101 are shown. It should be understood that the illustrated components have a substantially similar configuration about their entire circumference such that a cross-sectional view taken through another radial plane intersecting the central longitudinal axis "LA" of the first seal assembly 101 would be substantially similar. In embodiments, one or more regions of the components of the first seal assembly 101 can include a discontinuous cross-sectional shape, for example, one that is adapted to facilitate mechanical interconnection between the seal member 202 and the thrust ring 204 to inhibit relative rotation therebetween.

The seal member 202 is in the form of an annulus. The seal member 202 is adapted to sealingly engage, in a running fluid-tight seal, one of the members of the track joint assembly 84 which is rotationally movable with respect to another member thereof. In the illustrated example, the seal member 202 is adapted to sealingly engage the seal member engagement surface 180 of the outboard end collar 110 of the inner link 86, which can be considered the first member of the track joint assembly 84, and the sealing surface 209 of the first end face 154 of the bushing 97, which can be considered the second member of the track joint assembly 84, where the bushing 97 is rotationally movable with respect to the first member in the form of the outboard end collar 110 of the inner link 86 about the longitudinal axis "LA" of the track pin 95. In other embodiments, a seal member constructed in accordance with principles of the present disclosure can have a different cross-sectional shape (see, e.g., FIG. 11).

Referring to FIGS. 5 and 7, the illustrated seal member 202 is in a ring shape and is in engaging contact with an outer axial surface 215 of the thrust ring 204, circumscribing the thrust ring 204. The seal member 202 is made from a material that is resiliently flexible and adapted to serve as a contaminant and lubricant seal. The seal member 202 can be configured to fluidly seal the lubricant within the track joint assembly 84 and prevent contaminants from entering the track joint assembly 84.

The thrust ring 204 is in the form of an annulus. The thrust ring 204 is substantially cylindrical and includes the outer axial surface 215, an inner axial surface 216, and first and second end faces 218, 219. The outer and inner axial surfaces 215, 216 of the thrust ring 204 extend along the longitudinal axis "LA" between the first and second end faces 218, 219, which extend along a radial axis "RA" that is perpendicular to the longitudinal axis "LA."

Referring to FIG. 8, the thrust ring 204 can be provided to maintain a predetermined minimum axial clearance space, measured along the longitudinal axis "LA," for the seal member 202. In embodiments, the thrust ring 204 can be configured to prevent over-compression of the seal member 202 during operation and assembly (such as, by swaging, e.g.), which can lead to early seal failure, and to prevent the seal member from being crushed during assembly or operation by an excessive axial load. In embodiments, the thrust ring 204 is made from a suitable material, such as metal, adapted to withstand a predetermined axial load (e.g., 500 kN).

The illustrated thrust ring 204 has a thrust ring axial length 225, measured along the longitudinal axis "LA" between the first and second end faces 218, 219 configured such that the seal member 202 is allowed to compress to maintain a seal keep dirt out of, and the grease in, the track joint as the bushing 97 moves along longitudinal axis "LA" relative to the track pin 95. The thrust ring 204 is configured to limit the compression of the seal member 202 along the longitudinal axis "LA" to substantially prevent the seal member 202 from undergoing excessive strain during operation and assembly (such as during swaging of the track pin 95 and the inner and outer links 86, 88). The illustrated thrust ring 204 is adapted to resist a swage load of at least about 500 kN.

In some embodiments, the seal member 202 is separate from the thrust ring 204, and is frictionally fit around the thrust ring 204 and in engaged, contacting relationship therewith. In other embodiments, the seal member 202 can be connected to the thrust ring 204 by conventional means (such as by bonding, for example) to inhibit relative rotation therebetween about the rotational or longitudinal axis "LA."

Referring to FIG. 8, the seal member 202 is adapted for use in sealing a joint having a first member pivotable about a rotational axis relative to a second member thereof. In the illustrated embodiment, the rotational axis is substantially parallel to the longitudinal axis "LA" defined by the track pin 95. The seal member 202 includes a first member engagement surface 242, a second member engagement surface 244, a frusto-conical inner relief surface 246, a thrust ring engagement surface 248, and an outer relief surface 250.

The first member engagement surface 242 is adapted to sealingly engage the seal member engagement surface 180 of the first member (see FIG. 9). The first member engagement surface 242 includes an axial segment 260, extending along the rotational axis "LA," and a radial segment 262, extending along a radial axis "RA," which is perpendicular to the rotational axis "LA." The axial segment 260 of the first member engagement surface 242 is adapted to sealingly engage the outer cylindrical axial wall segment 182 of the seal cavity 125 (see FIG. 9). The radial segment 262 of the first member engagement surface 242 is adapted to sealingly engage the radial base segment 122 of the seal cavity 125 (see FIG. 9).

The illustrated axial segment 260 of the first member engagement surface 242 is substantially cylindrical. The axial segment 260 of the first member engagement surface 242 is substantially parallel to the rotational axis "LA." The axial segment 260 of the first member engagement surface 242 is substantially parallel to the longitudinal axis "LA" of the track pin 95 when installed about the track pin 95 in a joint assembly. In embodiments, the axial segment 260 of the first member engagement surface 242 can include a radial flange 264 projecting therefrom.

The axial segment 260 of the first member engagement surface 242 and the thrust ring engagement surface 248 are disposed in opposing relationship to each other and are substantially parallel to each other. In embodiments, the axial segment 260 of the first member engagement surface 242 can be disposed at an angle with respect to the thrust ring engagement surface 248 that is in a range from zero degrees to about fifteen degrees. The illustrated angle 240 between the axial segment 260 of the first member engagement surface 242 and the thrust ring engagement surface 248 is about zero degrees, i.e., the axial segment 260 of the first member engagement surface 242 is substantially parallel to the thrust ring engagement surface 248.

The illustrated radial segment 262 of the first member engagement surface 242 is substantially planar, defining an annular ring. The radial segment 262 of the first member engagement surface 242 is substantially perpendicular to the rotational axis "LA." The radial segment 262 of the first member engagement surface 242 is substantially perpendicular to the longitudinal axis "LA" of the track pin 95 when installed about the track pin 95 in a joint assembly.

The radial segment 262 of the first member engagement surface 242 is disposed in distal relationship to the second member engagement surface 244. The illustrated radial segment 262 and the axial segment 260 of the first member engagement surface 242 are substantially perpendicular to each other. In other embodiments, the radial segment 262 and the axial segment 260 can be disposed at a different angle with respect to each other.

In embodiments, the radial segment 262 of the first member engagement surface 242 and the thrust ring engagement surface 248 are disposed at an inner angle, with respect to each other, in a range from about thirty degrees to about one hundred fifty degrees. The illustrated radial segment 262 of the first member engagement surface 242 and the thrust ring engagement surface 248 are disposed in substantially perpendicular relationship with respect to each other.

The second member engagement surface 244 can be adapted to sealingly engage another component of a track joint (e.g., a "second member") which is rotatable with respect to the component (e.g., the "first member") with which the first member engagement surface is sealingly engaged. In the illustrated embodiment, the second member engagement surface 244 is adapted to sealingly engage the first end face 154 of the bushing 97, the "second member" in this example (see FIG. 9).

The second member engagement surface 244 is convex. The second member engagement surface includes a pair of convex segments 270, 271 and a crown segment 274 disposed between the pair of convex segments 270, 271. The crown segment 274 of the second member engagement surface 244 can be substantially planar. The pair of convex segments 270, 271 of the second member engagement surface 244 each has a radius of curvature 276, 277 which is less than a radius of curvature 280 of a concave segment 282 of the outer relief surface 250.

The second member engagement surface 244 is adjacent and between the axial segment 260 of the first member engagement surface 242 and the frusto-conical inner relief surface 246. The second member engagement surface 244 is in distal relationship with the radial segment 262 of the first member engagement surface 242, and a seal member axial length 285 is defined therebetween. The seal member axial length 285 can be measured along the rotational axis "LA" between the radial segment 262 of the first member engagement surface 242 and the crown segment 274 of the second member engagement surface 244, which are both substantially planar. In embodiments, the crown segment 274 can be the region of the second member engagement surface 244 that is furthest away from the radial segment 262 of the first member engagement surface 242, as measured along the rotational axis "LA."

In the illustrated embodiment, the second member engagement surface 244 extends radially outward, measured along the radial axis "RA," of the radial segment 262 of the first member engagement surface 242. In the illustrated embodiment, the crown segment 274 of the second member engagement surface 244 is radially offset, outwardly, from the radial segment 262 of the first member engagement surface 242.

The frusto-conical inner relief surface 246 is disposed adjacent the second member engagement surface 244 such that the second member engagement surface 244 is between the axial segment 260 of the first member engagement surface 242 and the frusto-conical inner relief surface 246.

The frusto-conical inner relief surface 246 extends between the thrust ring engagement surface 248 and the second member engagement surface 244. The inner relief surface 246 extends between an inner radial edge 287 of the second member engagement surface 244 and an axial edge 289 of the thrust ring engagement surface 248.

The frusto-conical inner relief surface 246 includes an inclined segment 294 which is disposed at an oblique angle "θ" with respect to the thrust ring engagement surface 248 and the rotational axis "LA." The frusto-conical inner relief surface 246 includes an inclined segment 294 which is disposed in oblique relationship to the longitudinal axis "LA" of the track pin 95 when installed about the track pin 95 in a joint assembly. The inclined segment 294 of the frusto-conical inner relief surface 246 is disposed with respect to the thrust ring engagement surface 248 at an angle "θ" in a range from about fifteen degrees to about seventy-five degrees in some embodiments. In other embodiments, the angle "θ" can be in a range from about twenty degrees to about sixty degrees. In still other embodiments, the angle "θ" can be in a range from about forty degrees to about fifty degrees. The illustrated angle "θ" between the inclined segment 294 of the inner relief surface 246 and the thrust ring engagement surface 248 is about forty-five degrees.

The thrust ring engagement surface 248 can be adapted to contactingly engage the outer axial surface 215 of the thrust ring 204. The illustrated thrust ring engagement surface 248 is substantially cylindrical. The thrust ring engagement surface 248 extends along the rotational axis "LA" and is substantially parallel thereto. The thrust ring engagement surface 248 is substantially parallel to the longitudinal axis "LA" of the track pin 95 when installed about the track pin 95 in a joint assembly. The thrust ring engagement surface is axially between the frusto-conical inner relief surface 246 and the radial segment 262 of the first member engagement surface 242.

The thrust ring engagement surface 248 has a thrust ring engagement surface axial length 305, measured along the rotational axis "LA," that is substantially the same as the thrust ring axial length 225 of the thrust ring 204. In embodiments, the thrust ring engagement surface axial length 305 of the thrust ring engagement surface 248 extends over at least fifty percent of the seal member axial length 285, measured along the rotational axis "LA" between the radial segment 262 of the first member engagement surface 242 and the crown segment 274 of the second member engagement surface 244. In other embodiments, the thrust ring engagement surface axial length 305 of the thrust ring engagement surface 248 extends over at least sixty percent of the seal member axial length 285. In the illustrated embodiment, the thrust ring engagement surface axial length 305 of the thrust ring engagement surface 248 extends over about seventy percent of the seal member axial length 285.

The axial edge 289 of the thrust ring engagement surface 248 is substantially axially aligned, along the rotational axis "LA," with an axial edge 310 of the axial segment 260 of the first member engagement surface 242. The axial edge 310 of the axial segment 260 of the first member engagement surface 242 delineates the interface between the axial segment 260 of the first member engagement surface 242 and an outer radial edge 312 of the second member engagement surface 244.

The axial segment 260 of the first member engagement surface 242 has an axial length 315, measured along the rotational axis "LA" between the axial edge 310 and an opposing axial edge 317 adjacent the outer relief surface 250. In embodiments, the thrust ring engagement surface axial length 305 of the thrust ring engagement surface 248, measured along the rotational axis "LA," is greater than the axial length 315 of the axial segment 260 of the first member engagement surface 242. In some embodiments, the thrust ring engagement surface axial length 305 of the thrust ring engagement surface 248 is at least about two times greater than the axial length 315 of the axial segment 260 of the first member engagement surface 242. In still other embodiments, the thrust ring engagement surface axial length 305 of the thrust ring engagement surface 248 is at least about three times greater than the axial length 315 of the axial segment 260 of the first member engagement surface 242.

In embodiments, the thrust ring engagement surface can include a convex segment 320 disposed adjacent the radial segment 262 of the first member engagement surface 242. The thrust ring engagement surface 248 extends between first and second axial edges 322, 289.

The outer relief surface 250 extends between the radial segment 262 and the axial segment 260 of the first member engagement surface 242. The outer relief surface 250 extends between the axial edge 317 of the axial segment 260 of the first member engagement surface 242 and an outer radial edge 330 of the radial segment 262 of the first member engagement surface 242.

The outer relief surface 250 includes the concave segment 282 and a pair of convex segments 332, 333—an inner convex segment 232 and an outer convex segment 333. The concave segment 282 is disposed between the convex segments 332, 333.

The concave segment 282 of the outer relief surface 250 is disposed in outer offset radial relationship to the frusto-conical inner relief surface 246. The illustrated concave segment 282 has a curvature 280 that is elliptical in shape.

The outer relief surface 250 has a radial length 335, measured along the radial axis "RA" between the outer radial edge 330 of the radial segment 262 and the axial edge 317 of the axial segment 260 of the first member engagement surface 242, that is greater than a radial length 340 of the radial segment 262 of the first member engagement surface 242. The outer relief surface 250 has an axial length 345, measured along the rotational axis "LA," that is greater than about forty percent of the seal member axial length 285, measured along the rotational axis "LA" between the radial segment 262 of the first member engagement surface 242 and the crown segment 274 of the second member engagement surface 244. A radial length 350 of the inner relief surface 246 is smaller than the radial length 335 of the outer relief surface 250.

Referring to FIG. 9, the first seal assembly 101 is installed in the seal cavity 125. It should be understood that, when the link is in the installed condition relative to the track pin 95, the seal member 202 will be in further compressive engagement between the outboard end collar 110 and the bushing 97. The second member engagement surface of the seal member 202 is in sealing engagement with the sealing surface 209 of the second member in the form of the first end face 154 of the bushing 97. The axial segment 260 of the first member engagement surface 242 of the seal member 202 engages and conforms to the outer cylindrical axial wall segment 182 of the seal member engagement surface 180 of the first member in the form of the outboard end collar 110 of the inner link 86. The radial segment 262 of the first member engagement surface 242 of the seal member 202 engages and conforms to the radial base segment 122 of the seal member engagement surface 180. The seal member 202 acts as a gasket and sealingly engages the seal member engagement surface 180 of the first member in the form of the outboard end collar 110 of the inner link 86. Compression of the seal member 202 provides the sealing force against the sealing surface 209 of the second member in the form of the bushing 97. The seal member 202 acts in the manner of a spring to apply an axial load against the sealing surface 209 of the first end face 154 of the bushing 97 along the longitudinal axis "LA" to bring the second member engagement surface 244 into sealing contact with the sealing surface 209 of the second member in the form of the bushing 97 such that a running fluid-tight seal is formed therebetween.

Referring to FIG. 10, the first end face of the bushing 97 is in engaging contact with the first end face 218 of the thrust ring 204. The second end face 219 of the thrust ring 204 is in engaging contact with the radial base segment 122 of the outboard end collar 110 of the inner link 86. The thrust ring 204 can be configured to engagingly contact the first end face 218 of the rotatable bushing 97 and the radial base segment 122 of the inner link 86 which is fixed to the track pin 95 by a swaged connection so as to limit relative movement in the axial direction along the longitudinal axis "LA" of the rotatable bushing 97 and reduce the compressive strain applied against the seal member 202. The thrust ring 204 can be provided to help prevent the seal member 202 from undergoing high strains (such as during the during the swaging process) that reduce the sealing capability of the component, leading to the entry of contaminants into the joint and grease out of the joint. In embodiments, the thrust ring 204 can be press fit upon the track pin 95 to thereby be rotatively coupled with the track pin 95 with the second end face 219 of the thrust ring in engaging contact with the radial base segment of the inner link 86.

In embodiments, the thrust ring 204 can be configured such that it limits the relative axial travel of the bushing 97 with respect to the track pin 95 such that the compressive strain applied against the seal member 202 is limited to a predetermined level (e.g., one which is determined to produce an acceptable material strain which helps maintain sealing capabilities of the seal member). In embodiments, the thrust ring 204 can be configured to help reduce the endplay of the bushing 97 to a predetermined amount.

In the illustrated embodiment, the seal member 202 deforms in response to the compressive force applied against it by the bushing. The seal member 202 substantially occupies the volume of the seal cavity, which has a reduced volume as controlled by the thrust ring axial length 225. In embodiments, the inner relief surface 246 and the outer relief surface 250 of the seal member 202 can be configured such that an inner relief area 370 and an outer relief area 372 are defined between the inner relief surface 246 and the first end face 154 of the bushing 97 and the outer relief surface 250 and the seal member engagement surface 180 of the inner link 86, respectively, which are areas of the seal cavity 125 which are unoccupied by the seal member.

Figure 11:
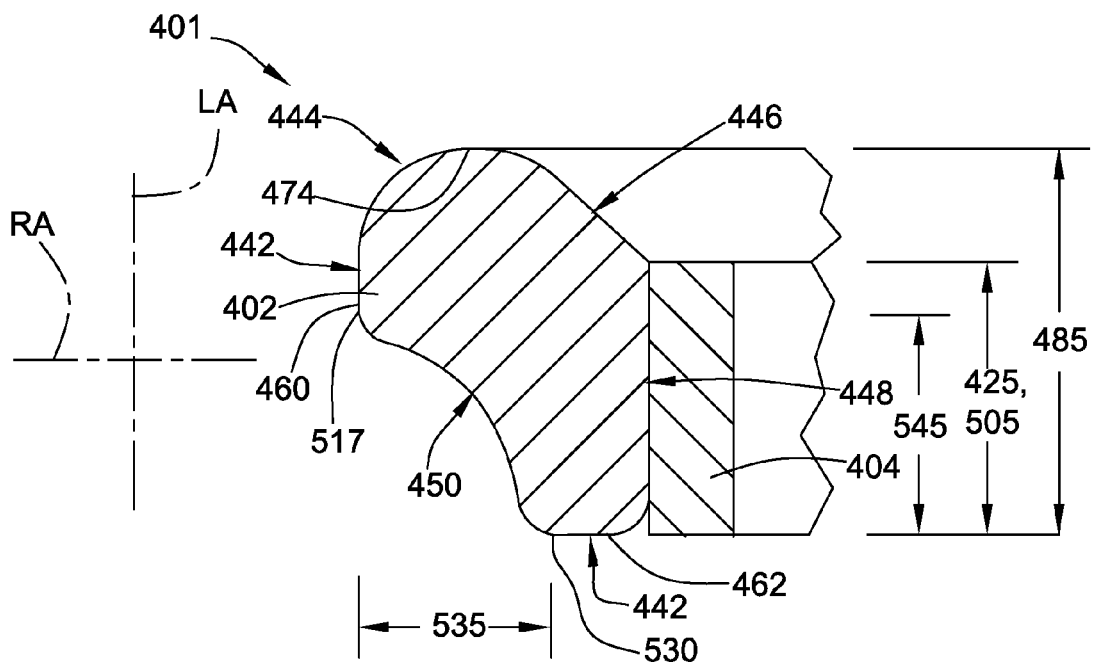
FIG. 11 is an enlarged, detail view as in FIG. 8 of another embodiment of a seal member constructed in accordance with principles of the present disclosure.

Referring to FIG. 11, another embodiment of a seal assembly 401 constructed in accordance with principles of the present disclosure is shown. The seal assembly 401 includes a seal member 402 and a thrust ring 404. The thrust ring 404 is substantially the same as the thrust ring 204 of FIG. 8. The thrust ring 404 has a thrust ring axial length 425 that is substantially the same as the thrust ring axial length 225 of the thrust ring 204 of FIG. 8.

The seal member 402 includes a first member engagement surface 442, a second member engagement surface 444, a frusto-conical inner relief surface 446, a thrust ring engagement surface 448, and an outer relief surface 450. A seal member axial length 485, measured along the rotational axis "LA" between a crown segment 474 of the second member engagement surface 444 and a radial segment 462 of the first member engagement surface 442, is substantially the same as the seal member axial length 285 of the seal member 202 of FIG. 8. The thrust ring engagement surface 448 has a thrust ring engagement surface axial length 505, measured along the rotational axis "LA," that is substantially the same as the thrust ring axial length 425 of the thrust ring 404.

The outer relief surface 450 of the seal member 402 of FIG. 11 has a radial length 535, measured along the radial axis "RA" between an outer radial edge 530 of the radial segment 462 and an axial edge 517 of an axial segment 460 of the first member engagement surface 442, that is greater than the radial length 335 of the outer relief surface 250 of the seal member 202 of FIG. 8. The outer relief surface 450 of the seal member 402 of FIG. 11 has an axial length 545, measured along the rotational axis "LA" between the radial segment 462 and the axial edge 517 of the axial segment 460 of the first member engagement surface 442, that is greater than the axial length 345 of the outer relief surface 250 of the seal member 202 of FIG. 8. The seal member 402 of FIG. 11 can be similar in other respects to the seal member 202 of FIG. 8. In other embodiments, a seal member constructed in accordance with principles of the present disclosure can have other configurations.

INDUSTRIAL APPLICABILITY

The industrial applicability of the embodiments of a seal assembly and a track joint assembly described herein will be readily appreciated from the foregoing discussion. At least one embodiment of the disclosed seal assemblies may be used for a track joint assembly. At least one embodiment of the disclosed track pin joint assemblies can be used in an undercarriage of a track-type machine. At least one embodiment provides a seal assembly that may maintain lubricant within a track joint and inhibit contaminants from entering. Embodiments of a seal assembly constructed in accordance with the present disclosure can be used to prevent over-compression of a seal member during swaging.

In general, a seal assembly has been disclosed that can help resist the ingestion of contaminants and thus help inhibit the occurrence of failures of a seal. Embodiments of the seal assembly can be used in an undercarriage joint that uses grease-lubricated track seals or other lubricant.

A seal assembly according to principles of the present disclosure may provide one or more of the following benefits. A seal assembly constructed according to principles of the present disclosure can withstand a swage load (e.g., 500 kN) without suffering reduced sealing capability which would lead to early seal failure. As such, the seal assembly can be used in an application where the links are mounted to the track pin with a swaged connection to address the problems of pin walking and excessive end play.

In embodiments of a seal assembly constructed accord to principles of the present disclosure, the swaging of the links onto the track pin helps prevent pin walking. The thrust can be configured to protect the seal member during assembly and operation from undergoing excessive strain which would impair its sealing ability. The thrust ring can also help to limit the endplay of the bushing.

A conventional seal member used in mid-size hydraulic excavators has a W-shaped cross section. Using finite element analysis simulation techniques, it was determined that the W-shaped seal member is not capable of carrying the thrust load applied during swaging of the link and track pin without undergoing excessive strain which could lead to premature failure of the seal.

Embodiments of a seal assembly constructed according to principles of the present disclosure can handle the swaging load (e.g. 500 kN). Using finite element analysis simulation techniques it was found that a seal member constructed in accordance with principles of the present disclosure can undergo an acceptable material strain and match the face load produced by a conventional W-shaped seal member at installation. A seal assembly constructed according to principles of the present disclosure can allow for a swaged connection between the links and the track pin at a reduced cost relative to other seal assemblies which use more components.

Furthermore, the relatively simple configuration of a seal member constructed in accordance with principles of the present disclosure avoid mold cavity limitations which can occur when producing seal members with a more complicated cross-sectional shape (e.g., a seal member with a W-shaped cross-sectional shape). For example, when making a W-shaped seal member, the opening of the mold becomes difficult thus requiring a four-piece mold (with two pieces known as "side pulls") which increases tooling cost and limits the production to only four pieces at one time. Embodiments of a seal member constructed in accordance with principles of the present disclosure can be made with a two-piece mold (a top and a bottom piece, with no side pulls) which can allow for the production of a mold that produces more than four pieces in a given mold shot.

Embodiments of a seal assembly, a track joint assembly, and an undercarriage according to principles of the present disclosure may find potential application in any machine, such as a track-type tractor, which utilizes a track-type undercarriage. Such machines may include, but are not limited to, excavators, dozers, loaders, or any other on-highway or off-highway vehicles or stationary machines that utilize a track chain assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal member adapted for use in sealing a joint having a first member pivotable about a rotational axis relative to a second member thereof, the seal member comprising:
   a first member engagement surface, the first member engagement surface including an axial segment, extending along the rotational axis, and a radial segment, extending along a radial axis perpendicular to the rotational axis;
   a second member engagement surface, the second member engagement surface adjacent the axial segment of the first member engagement surface;
   a frusto-conical inner relief surface, the frusto-conical inner relief surface adjacent the second member engagement surface such that the second member engagement surface is between the axial segment of the first member engagement surface and the frusto-conical inner relief surface;
   a thrust ring engagement surface, the thrust ring engagement surface extending along the rotational axis between the radial segment of the first member engagement surface and the frusto-conical inner relief surface; and
   an outer relief surface, the outer relief surface disposed between the radial segment and the axial segment of the first member engagement surface;
   wherein the second member engagement surface extends radially outward, measured along the radial axis, of the radial segment of the first member engagement surface.

2. The seal member of claim 1, wherein the axial segment of the first member engagement surface and the thrust ring engagement surface are substantially parallel to each other.

3. The seal member of claim 1, wherein the radial segment and the axial segment of the first member engagement surface are substantially perpendicular to each other.

4. The seal member of claim 3, wherein the radial segment of the first member engagement surface and the thrust ring engagement surface are disposed in substantially perpendicular relationship with respect to each other.

5. The seal member of claim 1, wherein the radial segment of the first member engagement surface and the thrust ring engagement surface are disposed in substantially perpendicular relationship with respect to each other.

6. The seal member of claim 1, wherein the second member engagement surface is convex.

7. The seal member of claim 6, wherein the second member engagement surface has a crown segment along the rotational axis, and the thrust ring engagement surface extends over at least fifty percent of a distance, measured along the rotational axis, between the radial segment of the first member engagement surface and the crown segment of the second member engagement surface.

8. The seal member of claim 6, wherein the second member engagement surface has a crown segment along the rotational axis, the crown segment being radially offset from the radial segment of the first member engagement surface.

9. The seal member of claim 6, wherein the second member engagement surface includes a pair of convex segments.

10. The seal member of claim 9, wherein the outer relief surface includes a concave segment having a radius of curvature, and the pair of convex segments of the second member engagement surface each has a radius of curvature which is less than the radius of curvature of the concave segment of the outer relief surface.

11. The seal member of claim 1, wherein the frusto-conical inner relief surface includes an inclined segment disposed with respect to the thrust ring engagement surface at an angle in a range from about fifteen degrees to about seventy-five degrees.

12. The seal member of claim 1, wherein the thrust ring engagement surface is substantially cylindrical and substantially parallel to the rotational axis.

13. The seal member of claim 1, wherein the thrust ring engagement surface has an axial length, measured along the rotational axis, greater than an axial length of the axial segment of the first member engagement surface.

14. The seal member of claim 1, wherein the thrust ring engagement surface has an axial length, measured along the rotational axis, about three times greater than an axial length of the axial segment of the first member engagement surface.

15. The seal member of claim 1, wherein the outer relief surface includes a concave segment disposed in outer offset radial relationship to the frusto-conical inner relief surface.

16. The seal member of claim 1, wherein the outer relief surface has a radial length, measured along the radial axis, that is greater than a radial length of the radial segment of the first member engagement surface.

17. The seal member of claim 1, wherein the outer relief surface has an axial length, measured along the rotational axis, that is greater than about forty percent of an axial length, measured along the rotational axis, between the radial segment of the first member engagement surface and a crown segment of the second member engagement surface.

18. A seal assembly adapted for use in sealing a joint having a first member pivotable about a rotational axis relative to a second member thereof, the seal assembly comprising:
- a thrust ring, the thrust ring including an outer axial surface extending along the rotational axis; and
- a seal member, the seal member mounted to the thrust ring and including:
  - a first member engagement surface, the first member engagement surface including an axial segment, extending along the rotational axis, and a radial segment, extending along a radial axis perpendicular to the rotational axis,
  - a second member engagement surface, the second member engagement surface adjacent the axial segment of the first member engagement surface,
  - a frusto-conical inner relief surface, the frusto-conical inner relief surface adjacent the second member engagement surface such that the second member engagement surface is between the axial segment of the first member engagement surface and the frusto-conical inner relief surface,
  - a thrust ring engagement surface, the thrust ring engagement surface extending along the rotational axis between the radial segment of the first member engagement surface and the frusto-conical inner relief surface, the thrust ring engagement surface in contacting relationship with the outer axial surface of the thrust ring, and
  - an outer relief surface, the outer relief surface disposed between the radial segment and the axial segment of the first member engagement surface;
  - wherein the second member engagement surface extends radially outward, measured along the radial axis, of the radial segment of the first member engagement surface.

19. The seal assembly of claim 18, wherein the thrust ring has an axial length, measured along the rotational axis, and the thrust ring engagement surface has an axial length, measured along the rotational axis, the axial length of the thrust ring engagement surface being substantially the same as the axial length of the thrust ring.

20. A track subassembly adapted for use in an undercarriage of a machine, the track subassembly comprising:
- a track pin defining a longitudinal axis;
- a first member and a second member both coaxial with the track pin about the longitudinal axis, the first member being pivotable about the longitudinal axis with respect to the second member, the first member including a seal member engagement surface defining, at least in part, a seal cavity disposed in proximal relationship to the second member, one of the first member and the second member being rotatively coupled to the track pin by a swaged connection; and
- a seal assembly, the seal assembly disposed in the seal cavity and sealingly engaging the first member and the second member, the seal assembly comprising:
  - a thrust ring, the thrust ring coaxial with the track pin about the longitudinal axis, the thrust ring including an outer axial surface, an inner axial surface, and first and second end faces, the outer axial surface and the inner axial surface extending along the longitudinal axis between the first and second end faces, the inner axial surface in proximate relationship with the track pin, and
  - a seal member, the seal member mounted to the thrust ring and including:
    - a first member engagement surface, the first member engagement surface in sealing relationship with the seal member engagement surface of the first member, the first member engagement surface including an axial segment, extending along the longitudinal axis, and a radial segment, extending along a radial axis perpendicular to the longitudinal axis,
    - a second member engagement surface, the second member engagement surface in sealing relationship with the second member, the second member engagement surface adjacent the axial segment of the first member engagement surface,
    - a frusto-conical inner relief surface, the frusto-conical inner relief surface adjacent the second member engagement surface such that the second member engagement surface is between the axial segment of the first member engagement surface and the frusto-conical inner relief surface,
    - a thrust ring engagement surface, the thrust ring engagement surface extending along the longitudinal axis between the radial segment of the first member engagement surface and the frusto-conical inner relief surface, the thrust ring engagement surface in contacting relationship with the outer axial surface of the thrust ring, and
    - an outer relief surface, the outer relief surface disposed between the radial segment and the axial segment of the first member engagement surface;
  - wherein the second member engagement surface extends radially outward, measured along the radial axis, of the radial segment of the first member engagement surface.

* * * * *